May 22, 1962

P. ÅGREN 3,035,327

DEVICE FOR THE PRODUCTION OF MATS FROM YARNS OF FIBROUS MATERIAL

Filed Nov. 8, 1960

INVENTOR.
PER ÅGREN
BY Bailey, Stephens &
Huettig
Attorneys

May 22, 1962
P. ÅGREN
3,035,327
DEVICE FOR THE PRODUCTION OF MATS FROM YARNS OF FIBROUS MATERIAL
Filed Nov. 8, 1960
2 Sheets-Sheet 2
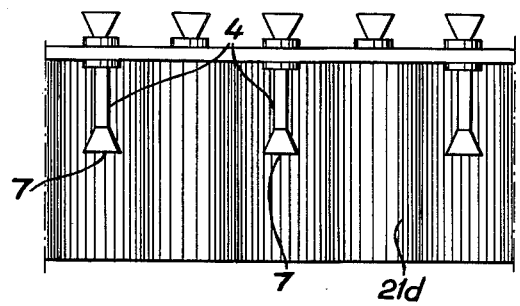
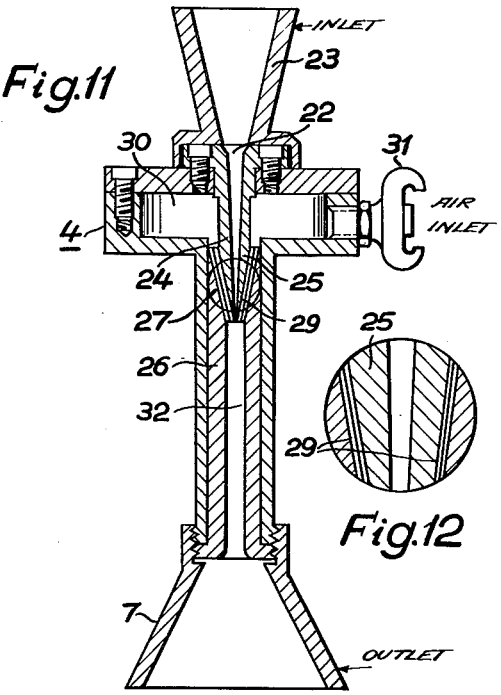
INVENTOR.
PER ÅGREN
BY Bailey, Stephens &
Huettig
Attorneys ered May 22, 1962

3,035,327
DEVICE FOR THE PRODUCTION OF MATS FROM YARNS OF FIBROUS MATERIAL
Per Ågren, Vasteras, Sweden, assignor to Allmänna Svenska Elektriska Aktiebolaget, Vasteras, Sweden, a corporation of Sweden
Filed Nov. 8, 1960, Ser. No. 68,119
Claims priority, application Sweden Nov. 11, 1959
4 Claims. (Cl. 28—1)

The present invention relates to a device for the production of mats from yarns with great length consisting of glass fibres or similar fibres.

It is known that such mats can be produced from glass fibre yarns through the yarns being carried by a mechanical transport device to a number of ejectors placed substantially parallel with each other, to be thereafter transported by gas streams produced in the ejectors through these, and further to a surface which moves in a direction substantially parallel to the shafts of the ejectors and which thereby picks up the yarns while forming a mat. In order to increase the adhesion between the threads in the mat, it is known to supply a binding agent and possibly to subject the binding agent to a heat treatment while the mat is on the movable surface.

In order to prevent the mats becoming uneven in thickness as a consequence of the formation of longitudinally running accumulations, or rolls with larger quantities of material than surrounding parts, it has been proposed to arrange screens between the ejectors and parallel, or substantially parallel to the direction of their shafts. These screens, which extend outside the outlet orifices of the ejectors, prevent among other things, disturbances in the flow course in or outside the outlet orifices of one ejector influencing the flow course outside the outlet orifices or other ejectors.

A particular difficulty with the production of glass fibre mats from yarns of great length according to the described method consists in effecting sufficient strength in the latitudinal direction of the mat. Because the gas streams are directed along the surface which gathers up the threads, the threads will arrange themselves in the longitudinal direction of the mat. It is known to try and prevent the threads lying mainly in this way, by seeing that while passing the ejectors the threads are subjected to turning or twisting, which results in the threads falling down onto the movable surface in the form of spirals or similar figures with varying threads direction. However, it has been shown that the equalization of the fibre distribution which can be obtained by this means is in most cases not sufficient. Even if the threads are subjected to turning or twisting while passing the ejectors, the strength in the latitudinal direction of a produced mat will be far from that in the longitudinal direction.

Surprisingly, it has now been shown possible, with a device according to the present invention, to remedy without difficulty the above mentioned disadvantage with previously manufactured mats, consisting in the strength in the latitudinal and longitudinal directions being different, and to produce mats which, in addition to similarity in stability in the mentioned directions, also have a very even material distribution and thickness.

The object of the invention is a device for the production of mats from threads with great length, consisting of glass fibres or similar fibres, which comprises a substantially horizontal, movable surface and a number of nozzles which are horizontal, or form a certain angle with the horizontal plane, and in which gas streams are simultaneously produced which transport threads of the fibrous material through the nozzles and afterwards to the movable surface which picks up the threads during the formation of a mat, which device is characterised in that it is provided with pleated screens arranged so that each nozzle is provided with a screen parallel to the direction of its shaft and extending outside the outlet orifice of the nozzle, which screen has side walls which extend in a direction between the nozzle and adjacent nozzles and an aperture which extends along one side of the nozzle and e.g. is either turned downwards or upwards. The screens could with advantage be turned alternately upwards and downwards. They could form a continuous unit consisting of one plate with several pleats. This plate can then be arranged so that the nozzles are situated alternately over and under the plate. It is particularly advantageous to arrange the screens so that they extend so far outside the outlet orifices of the nozzles that the threads come into contact with them after transport through the nozzles.

By threads of great length is meant yarns which could be kept wound on spindles, rollers or the like from which they could be unwound. The yarns could, for example, consist of untwisted or twisted continuous glass fibre threads, spun staple glass fibre threads or similar products of other textile fibres such as polyamide fibres, polyethylene glycol terephthalate fibres, etc. The nozzles could be horizontal but could also point obliquely upwards or obliquely downwards. The yarn which flows out of the nozzles under all circumstances has a component of motion parallel with the transport direction of the movable surface.

The pleated screens and the plate with several pleats, respectively, could be made of an arbitrary construction material such as metal, wood, plastic, etc.

The invention is more closely described with reference to the figures in the accompanying drawings.

FIGURE 10 shows an arrangement according to FIGURE 6, seen from above, in which the screens of the nozzles form a continuous unit consisting of a plate provided with several pleats and in which the nozzles are situated alternately over and under the plate.

FIGURE 11 shows a detailed example of a usable nozzle.

FIGURE 12 is an enlargement of the encircled portion of the ejector in FIGURE 11.

Figure 1:
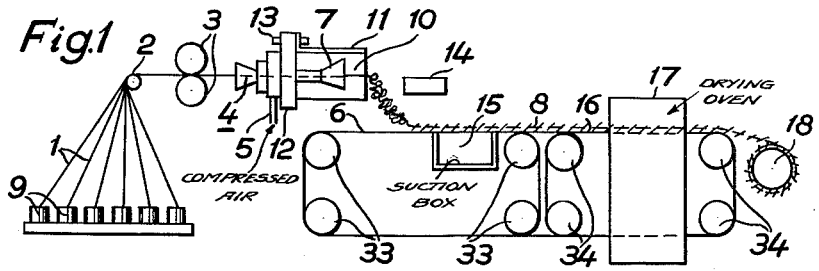
FIGURE 1 shows schematically a side view of a device according to the invention in which the shown nozzle and the shown screen are enlarged.
Figure 2:
FIGURE 2 shows a piece of a mat, seen from above, produced by the device according to FIGURE 1.
Figure 3:
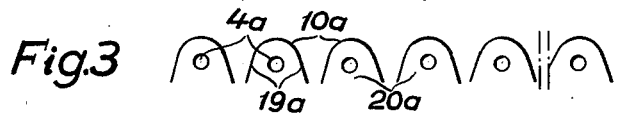
FIGURES 3–5 and FIGURE 8 show different arrangements, seen in front view, in which each nozzle has a separate screen.
Figure 4:
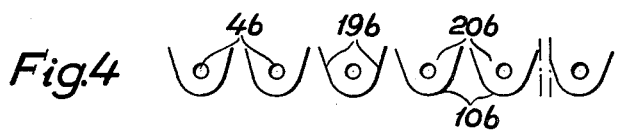
Figure 5:
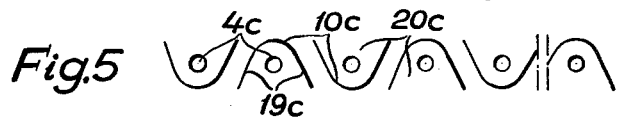

In the production of a mat in the embodiment of the invention exemplified in FIGURE 1, the yarns 1 are brought via a guide roller 2, by a mechanical conveying device 3 consisting of two cylinders working against each other in opposite directions, to a number of nozzles 4 placed in parallel beside each other, one of which is visible in the figure. The fibre threads are transported through the nozzles by gas flows which are produced by supplying compressed air via the feeding pipe 5, and further, downwards onto a gauze wire 6. In the region outside the outlet orifices 7 of the nozzles, the threads form spirals, loops and the like, before they are picked up by the wire during the formation of a mat 8, which seen from above, is shown in FIGURE 2. The formation of spirals or loops is connected at least partly with the threads undergoing a certain turning or twisting in conjunction with the threads being unwound from the bobbins 9, a turning or twisting which can then be enlarged at the passage of the nozzle. Outside the orifices of the nozzles the threads are influenced by the pleated screens 10, one of which is shown in FIGURE 1. The positioning of the screens in relation to the nozzles is represented in FIGURES 3–10. As seen in FIGURE 1, the screens extend outside the outlet orifices 7 of the nozzles, which is of vital importance. The screens 10 are suspended from pins 11 which are attached to a support 12 by bolts 13.

When the threads are picked up by the wire 6 carried by the rollers 33 the mat 8 is formed as mentioned before. The thickness of the mat can be varied, among other things, by varying the number of threads 1 which are brought together from the spools 9 and to each nozzle 4. Binding agent may possibly be supplied to the mat via a device 14 in order to increase the adhesion between the threads in the mat. The device 15 constitutes a suction box which draws the threads against the wire and which, if binding agent is added, draws off any excess. If binding agent is used the mat can be lifted over onto another wire 16 carried by the rollers 34 which carries the mat through a drying oven 17 before the mat is wound onto a winding device 18.

FIGURES 3–9 show examples of pleated screens 10a–g in the device according to the invention and their positions in relation to the nozzles 4a–g. The nozzles and their screens are seen from a point outside the outlet orifices of the nozzles and above the movable surface. The screens have side walls 19a–g which extend in the direction between the nozzles. The apertures of the screens 20a–g are turned downwards (20a, e) upwards (20b), or alternately upwards and downwards (20c, d, f, g). In the last mentioned case the screens need not, in accordance with the figures, be arranged so that they are turned alternately upwards and downwards but several, adjacent to each other, may be turned in the same direction. The screens in FIGURES 6, 7 and 9 form a continuous unit consisting of a plate 21d, e, g with several pleats. The plate can then be so arranged that the nozzles are situated alternately over and under the plate (21d, e, g).

Each screen can, of course, consist of separate parts. So, for example, each screen may be formed from two separate elements, each corresponding in position and appearance to a side wall such as that designated 19 in FIGURES 3–9. The two parts are then pointed so that their main directions form an angle with each other.

Figure 6:
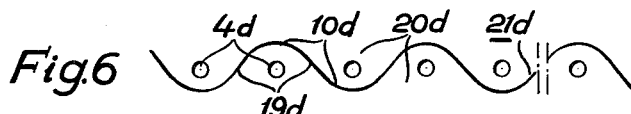
FIGURES 6, 7 and 9 show different arrangements, likewise seen in front view, in which the different screens of the nozzles form a continuous unit consisting of plates provided with several pleats.
Figure 7:
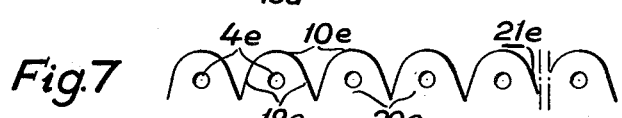
Figure 8:
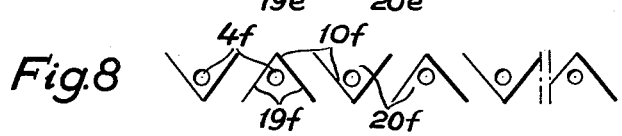
Figure 9:
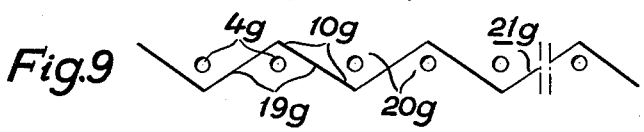

FIGURE 10, which shows the screens and nozzles arranged according to FIGURE 6, seen from above, indicates how the screens, in this case consisting of a plate 21d, extend outside the orifices 7 of the nozzles.

The nozzle or ejector exemplified in FIGURE 11 has an axially throughrunning hole 22, limited by the inlet mouthpiece 23, a cylindrical part 24 with external conical part 25, a cylindrical pipe 26 with external conical 27 and the outlet orifice 7. The conical part 25 is provided with four symmetrically situated longitudinally running grooves 29, through which the compressed air from the chamber 30 and the compressed air inlet 31 streams out into the hole 32.

What I claim is:

1. Means for manufacturing mats of fibre threads with great length comprising a substantially horizontal surface capable of motion in a plate, a plurality of nozzles, each nozzle having coaxial inlet and outlet orifices and an axis running through said inlet and said outlet orifices, said nozzles being arranged transversely with respect to said surface, the axes of said nozzles lying in substantially parallel vertical planes and each having a horizontal direction component generally parallel to said path, means to supply gas to said nozzles to transport fibre threads of great length introduced into the inlet orifices of said nozzles simultaneously through said nozzles and to said surface capable of motion, which picks up said threads while forming a mat, each nozzle being provided with a screen extending outside said outlet orifice of said nozzle, said screen having the form of an open channel with side walls and a connection between said side walls, said open channel running parallel to the direction of the axis of said nozzle with said side walls extending between said nozzle and adjacent nozzles and with the aperture and said connection lying on opposite sides of said axis of said nozzle.

2. Means as claimed in claim 1 in which the axes of said nozzles are substantially horizontal.

3. Means as claimed in claim 1 in which said screens form a continuous unit comprising a plate with several pleats.

4. Means as claimed in claim 1 in which each of said side walls of said screen constitutes a separate plate.

References Cited in the file of this patent

UNITED STATES PATENTS

| | | |
|---|---|---|
| 2,638,146 | Rounseville et al. | May 12, 1953 |
| 2,653,416 | Slayter | Sept. 29, 1953 |

UNITED STATES PATENT OFFICE

CERTIFICATE OF CORRECTION

Patent No. 3,035,327                     May 22, 1962

Per Ågren

It is hereby certified that error appears in the above numbered patent requiring correction and that the said Letters Patent should read as corrected below.

Column 4, line 16, for "plate" read -- path --.

Signed and sealed this 20th day of August 1963.

(SEAL)
Attest:

ERNEST W. SWIDER
Attesting Officer

DAVID L. LADD
Commissioner of Patents